Feb. 25, 1958 J. R. ORELIND 2,824,416
BALANCED HEAD MOWER
Filed June 22, 1956 2 Sheets-Sheet 1
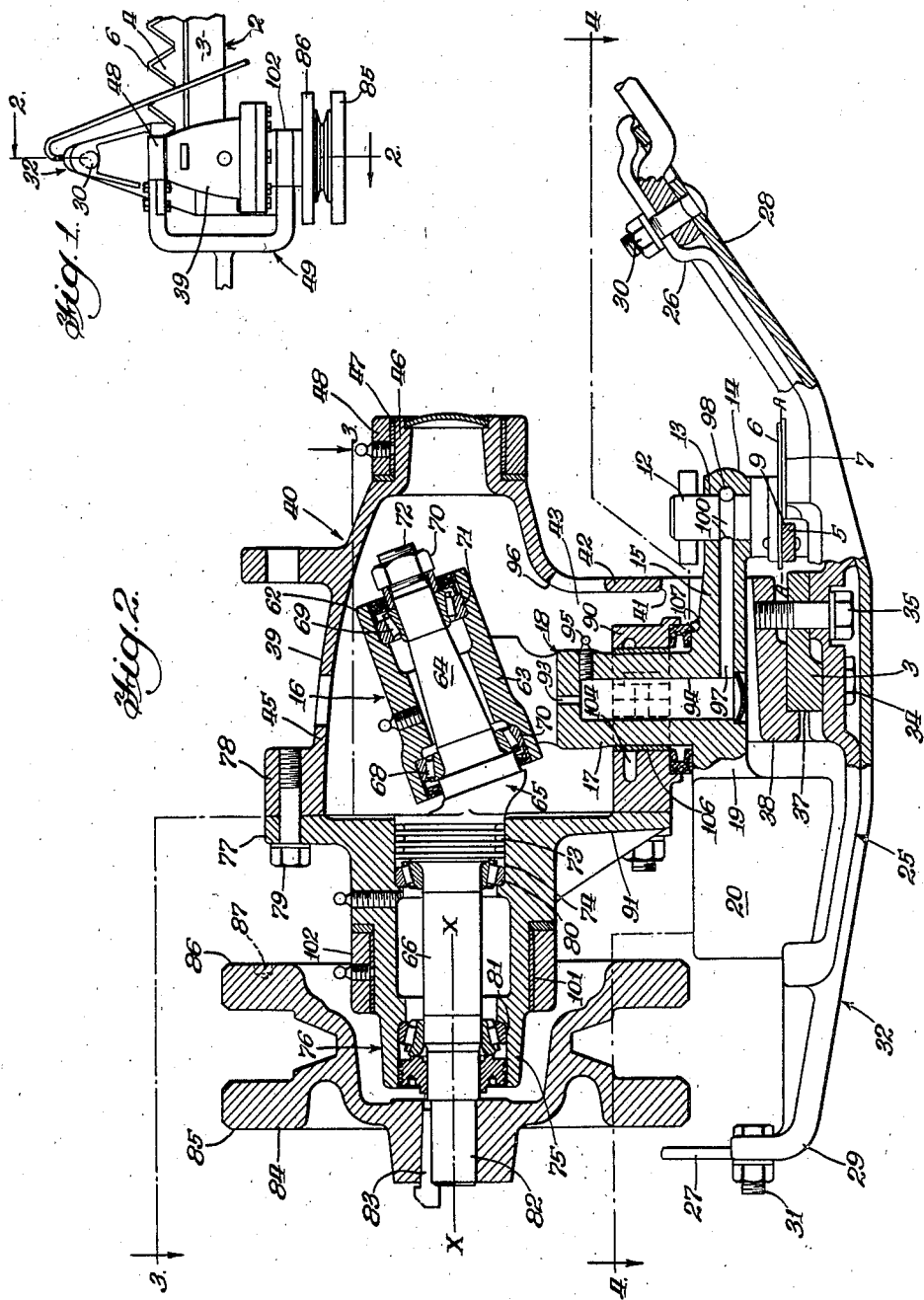
Inventor:
John R. Orelind
Paul O. Pipper
Atty.

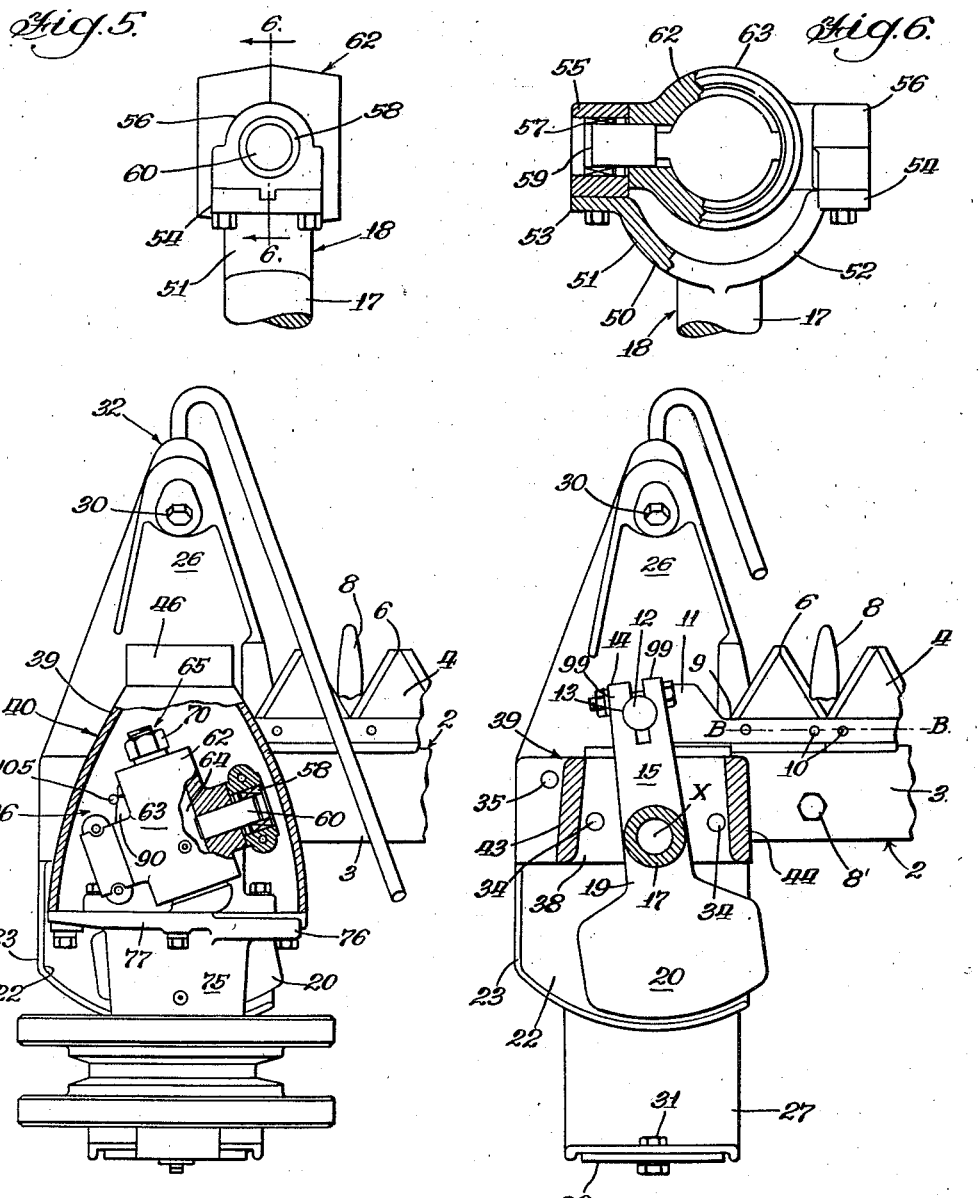

United States Patent Office 2,824,416
Patented Feb. 25, 1958

2,824,416

BALANCED HEAD MOWER

John R. Orelind, Wilmette, Ill., assignor to International Harvester Company, a corporation of New Jersey Application June 22, 1956, Serial No. 593,156

12 Claims. (Cl. 56—296)

This invention relates to mowers and more particularly to a novel dynamically balanced mower.

A general object of the invention is to provide a novel drive for a reciprocating sickle of a mower which is of compact and durable construction and which provides a simple and effective drive for the sickle.

A more specific object of the invention is to provide a novel drive which is only contained and supported on the inner shoe structure of a mower and wherein the drive includes an oscillating or pendulating member which swings on a vertical axis, the pendulating member having rearwardly and forwardly extending diametrically opposed arms and the rearward arm being connected to a counterweight and the forward arm to the sickle.

A further object of the invention is to provide a novel connection and arrangement of the counterweight and the sickle wherein both swing on concentric arcs or arcs on the same circle in order to effect a truer dynamic balance.

A still further object of the invention is to provide in the drive last mentioned an arrangement of the counterweight and the sickle such that the mass of the counterweight is concentrated so that its swing is limited to substantially the width of the inner shoe and the center of gravity of the counterweight is located substantially coplanar with a sickle.

A still further object of the invention is to provide a novel combination housing and support structure for the driving mechanism wherein the housing has front and rear separable parts and the rear part carries all of the driving mechanisms so that it may be removed in toto with the separation of the rear part of the housing from the forward part whereby the structure is accessible for repair and the mounting greatly simplified.

These and other objects of the invention will become more apparent from the specification and the drawings wherein:

Figure 1 is a fragmentary plan view of a mower incorporating the invention;

Figure 2 is an enlarged transverse vertical sectional view of the mower head taken substantially on the line 2—2 of Figure 1;

Figure 3 is a reduced horizontal sectional view taken substantially on the line 3—3 of Figure 2;

Figure 4 is a further horizontal sectional view taken substantially on the line 4—4 of Figure 2;

Figure 5 is a fragmentary enlarged end view on the scale of Figure 2 of the wobble drive and output yoke; and Figure 6 is a side view of the structure shown in Figure 5.

Describing the invention in detail, there is shown essentially a conventional mower generally indicated 2 which comprises a mower bar 3 on which is mounted for reciprocation a conventional sickle 4 for operation in a generally horizontal plane indicated A—A in Figure 2 and on a given line indicated B—B in Figure 4, the line, of course, being in the plane A—A. The sickle comprises the conventional backing bar or backbone 5 with the knives 6 connected thereto which cooperate with the ledger plates 7 which are mounted on the fingers 8 which are suitably connected as by bolts 8' to the cutter bar 3 and form part thereof as will be readily understood by those skilled in the art.

The stubbleward end 9 of the sickle 4 is connected by its backbone 5 as by rivets 10 to a knifehead 11 to which there is connected or fixed a vertical pin or pivot member 12 which journals or pivots in an opening 13 in the forward end 14 of a forward output arm 15 of the sickle drive mechanism generally designated 16.

The arm 15 is formed integral with an upstanding spindle portion 17 of an output member generally indicated 18. The spindle 17 is formed integral with a rearwardly extending rear arm 19 which extends diametrically opposite to the arm 15 and at its rearward end is provided with a counter-weight 20. The counterweight as will be readily seen from a consideration of Figures 2 and 4 is a compact mass and is formed and arranged to have its center of gravity substantially coplanar with the plane A—A, that is the plane of the sickle, and it will be readily observed from Figure 4 that the center of gravity of the counterweight is spaced diametrically opposite to the center of the pivot 12 and at the same distance from the axis X (Figure 4) which represents the vertical axis of oscillation of the member 18. The counterweight is preferably confined within a pocket 22 formed by upstanding peripheral flange 23 which is formed on the intermediate portion of a foundation plate structure generally indicated 25 (Fig. 2) and which at its front and rear extremities 26 and 27 bolts to the forward and rear ends 28 and 29 as at 30 and 31 of the inboard or inner shoe structure generally designated 32. It will be seen that the foundation or mounting plate structure 25 overlies the shoe 32 and intermediate its ends is fastened as by bolts 34 and 35 to the inner or stubbleward end portion 37 of the cutter bar 3 and also to the bottom transverse web 38 of the forward portion or section 39 of the housing generally indicated 40, the said housing enclosing the drive member 18 and having a forward opening 41 accommodating the extension of the forward arm 15 through the forward wall 42 of the housing. It will be seen that the housing in addition to the transverse bottom wall 38 comprises upstanding inboard and outboard walls 43 and 44 which merge into an upper conical forwardly tapered body portion generally indicated 45 and the forward extremity of the body portion is narrowed into a pivot bearing portion 46 which extends essentially horizontally on an axis substantially normal to the line B—B of Figure 4 and provides a pivot as at 47 for one end 48 of the supporting yoke generally indicated 49.

The body portion encloses the upper end of the output member 18 which includes a bifurcated yoke structure 50 including a pair of laterally spaced upwardly extending arms 51 and 52 which terminate in bearing support halves 53 and 54 to which are secured caps 55 and 56 which clamp bearings 57 and 58, Figures 6 and 3, the bearings 57, 58 journaling coaxial shafts 59 and 60 which are connected to and disposed at diametrically opposite sides of a wobbler 62.

The wobbler 62 comprises a center body portion 63 which is sleeved over the throw 64 of the crank generally indicated 65, the throw being disposed at an angle to the axis X—X of the input shaft indicated 66 which is substantially normal to the axis or line B—B of reciprocation of the sickle. The crank portion 65 is of the cantilever type and journals the body portion 63 of the wobbler via bearings 68 and 69 which are suitably received within recesses 70 and 71 in opposite ends of the body portion 63 and the parts are maintained in assembled relationship by means of a nut 70 which is threaded on the free end 72 of the throw 64. The crank 65 constitutes the inner end of the input shaft 66, which shaft, is provided adjacent to the throw portion 64 with a series of oil slinger members 73 which operate within a bore 74 in the journal portion 75 of the rear portion or part 76 of the housing 40, the said rear portion 76 having an upright forward wall 77 which is clamped in a plurality of places to an outturned flange 78 which is formed about the rear extremity of the forward portion 39, bolts 79 securing the wall 77 to the flange 78.

The shaft 66 extends through the bearing portion 75 and is journaled thereon by a pair of spaced bearings 80 and 81 and has an outer end portion 82 to which is keyed as at 83 a flywheel type of pulley 84.

This pulley 84 has a pair of thick annular flanges 85 and 86 which are suitably drilled at 87 in order to counter balance the moments developed by the throw 64, wobbler etc. connected thereto as the drive proceeds to the member 18. The said member 18 is supported on its spindle portion 17 on the vertical axis X by means of a split bearing 90 which is clamped about the spindle portion 17 and secured to the lower part 91 of the wall 77 of the rear portion 76 of the housing, said lower part 91 of the wall 77 terminating above the counterweight 20 which extends therebeneath.

It will be seen that the spindle portion 17 is a hollow structure that has an upper vent opening 93 for a reservoir 94 which is adapted to be filled by grease fitting 95 through an access opening 96 in the front wall 42 of the forward housing portion, the reservoir 94 communicating with a longitudinal passage 97 in the arm 15 which communicates with the lower end of the reservoir 94 and with the vertical opening 13 through which the pivot pin 12 extends.

It will be seen that pin 12 is retained in assembled relationship with the arm by means of a transverse bolt 98 which extends through the lugs 99 of the arm 15 and through a peripheral groove 100 in the pin 12.

It will be readily appreciated that compact structure is provided and that the journal portion 75 of the rear part of the housing provides an external pivot at 101 (Fig. 2) to which the opposite end portion 102 of the coupling arm is connected so that the vertical pivot for the mower bar and the axis of the input shaft 62 are coaxial whereby the mower bar may be vertically swung up and down while the mower is operating, that is without interrupting the drive.

Referring now to the support for the output shaft it will be seen that the split bearing structure 90 is provided with a reservoir 104 into which grease is adapted to be entered via the fitting 105 (Fig. 3) and the grease being retained in the bearing 106 by the split seal 107 which surrounds the spindle portion 17 beneath the bearing structure 90.

What is claimed is:

1. For use in a mower of the type comprising a mower bar and a sickle reciprocal thereon on a given line, a housing having a first part for affixation to the cutter bar and a second part removably connected to a side of the first portion, and sickle drive mechanism mounted entirely on said second part, said second part having a journal, an input shaft rotatably supported on said journal on a generally horizontal axis extending substantially normal to said line and having a cantilever portion including a crank extending angularly to said axis within said first portion of the housing, a wobbler mounted in driven relation by the crank, a wobbler drive transmitting member connected in driven relationship to said wobbler for rotary oscillation on a substantially vertical axis and having first and second diametrically oppositely extending arms, a counterweight on one arm and means connecting said sickle to said other arm on a substantially vertical axis.

2. Sickle drive mechanism comprising a support adapted for connection to the cutter bar of an associated mower, an element mounted on the support for oscillation about a vertical axis, diametrically extending arms on said element, a counterweight directly connected to one arm, and means pivotally connecting said sickle to said other arm on a fixed axis for swinging movement on an arc with said fixed axis coincidental with swinging movement on a concentric arc by said counterweight in an opposite direction to the sickle, said sickle and counterweight disposed to dynamically balance each other.

3. A drive for a mower of the type comprising a cutter bar and a sickle reciprocal thereon on a given line, a housing having first and second removably interconnected portions, one of said portions having means thereon for the fixed mounting thereof on said cutter bar, the other of said portions having a journal, an input shaft supported on said journal on a generally horizontal axis extending substantially normal to said line of reciprocation of the sickle and having an inner end portion extending within the housing and an outer end portion without the housing, said inner end portion comprising a crank having a throw angularly disposed to said axis, a wobbler mounted on said throw in driven relation thereby, an output member pivotally supported in said housing on a substantially vertical axis and having an upper end including a yoke with a pair of arms embracing said wobbler and connected thereto in driven relation thereby, said output member comprising a pair of diametrical arms extending transversely of said line of reciprocation of the sickle, means drivingly connecting one of said arms to said sickle, and counterweight means connected to the other of said arms.

4. The invention according to claim 3 and a rotary drive transmitting member connected to the outer end of said shaft and dynamically balanced with said inner end of the shaft and mechanism mounted thereon.

5. In a mower of the type comprising a cutter bar and a sickle reciprocal thereon on a given line and in a given plane, a housing having means thereon for the fixed mounting thereof on said cutter bar and having a journal, an input shaft rotatably mounted in said journal on a generally horizontal axis extending substantially normal to said given line, said shaft having an inner end portion within the housing and including a crank with a throw angularly displaced from said axis, a wobbler mounted on said throw in driven relation thereby, an output member mounted within said housing for oscillation on a substantially vertical axis at one side of said sickle, and having a pair of arms spaced circumferentially of said vertical axis, means drivingly connecting one of said arms to said sickle, and a counterweight connected to the other of said arms coplanar with the sickle.

6. The invention according to claim 5 and said counterweight having a center of gravity disposed substantially coplanar with said plane of reciprocation of the sickle.

7. The invention according to claim 5 and said arms disposed in diametrically opposed relationship and said counterweight having a concentrated mass and having a center of gravity substantially coplanar with said sickle.

8. The invention according to claim 5 and said counterweight integrally united with said one arm and having a center of gravity substantially coplanar with said sickle, and said connection of said other arm and said sickle comprising a fixed pivot therebetween on a vertical axis whereby the mass of the sickle swings in an arc concentric with the arc of movement of the counterweight.

9. In a mower of the type comprising a mower bar and a sickle reciprocal thereon in a given plane and on a given line transverse to the direction of movement of the mower, a housing having a forward portion and a rearward portion removably connected to the forward portion, one of said portions connected to one end of the mower bar, said forward portion having a forwardly tapered generally conical body terminating in a forward pivot for connection to an associated support for pivoting on a generally horizontal fore and aft axis, said rear portion having a journal coaxial with said forward pivot for external connection to said support, and means for driving said sickle solely supported by said rear portion, and means releasably connecting said driving means to said sickle to accommodate assembly and disassembly of said rear housing portion with said driving means.

10. A counterbalanced drive for a mower of the type including a cutter bar and a sickle reciprocal thereon on a given line and in a given plane, a housing having means thereon for the fixed mounting thereof on the cutter bar, a cantilever suspended input shaft journaled on the housing and including an overhanging crank with a throw inclined to the axis of the shaft, a wobbler mounted upon said throw in driven relation thereby, an output yoke connected to said wobbler in driven relation thereby for oscillation on a substantially vertical axis, said yoke including an upright spindle terminating in a lower end above said cutter bar, fore and aft extending front and rear arms connected with the spindle, a counterweight integral with said rear arm, and said front arm projecting over the sickle, and a pin fixedly connecting said front arm with the sickle on a vertical axis to effect swinging movement of said sickle on an arc about said vertical axis on a radius substantially equal to the radius of said rear arm to the center of gravity of said counterweight.

11. In a drive of the class described comprising a housing, an input member mounted thereon for rotation on a generally horizontal axis, an output member mounted in the housing for oscillation on a substantially vertical axis, motion converting means drivingly interconnecting said input and said output members, a rotary drive member connected to the input member and including flywheel portions dynamically balanced with said motion converting means, a horizontal arm connected intermediate its ends to said output member and having means at one end for connection to an associated reciprocal working member, and a counterweight directly connected to the other end of said arm.

12. In a drive of the class described comprising a housing, an input member mounted thereon for rotation on a generally horizontal axis, an output member mounted in the housing for oscillation on a substantially vertical axis, motion converting means drivingly interconnecting said input and said output members, and said output member having an upper end comprising a yoke having a pair of laterally spaced upstanding portions and a spindle depending from the yoke and having an integral radial arm with a vertical pivot opening therein for a pivotal connection to an associated driven member, and lubrication means for said pivotal connection including a replenishable reservoir in said spindle above said arm, said arm having a conduit extending between said reservoir and said pivot opening.

References Cited in the file of this patent

UNITED STATES PATENTS

| | | |
|---|---|---|
| 1,390,890 | Dyer | Sept. 13, 1921 |
| 2,619,839 | Love | Dec. 2, 1952 |